United States Patent Office 3,682,829
Patented Aug. 8, 1972

3,682,829
PRODUCTION OF LOW SILICA CONTENT DRY, GRANULAR AUTOMATIC DISH WASHING DETERGENT
Robert S. Cooper, Arlington Heights, and Donald C. Wood, Des Plaines, Ill., assignors to De Soto, Inc., Des Plaines, Ill.
No Drawing. Filed Sept. 10, 1970, Ser. No. 71,222
Int. Cl. C11d 7/56
U.S. Cl. 252—99    8 Claims

ABSTRACT OF THE DISCLOSURE

Dry, granular automatic dish washing detergent is provided by slowly spraying aqueous alkali metal silicate solution of relatively high silica content onto agitated particles of anhydrous granular alkali metal tripolyphosphate to directly provide a dry powder having a silica content in the range of 8.5 to 10% by weight, based on the weight of the silicated tripolyphosphate. The granular particles in the dry powder have a core of alkali metal tripolyphosphate with the silicate being superimopsed about the polyphosphate core. From about 0.5 to about 3% of a chlorinated isocyanurate is added to provide active chlorine in a stable composition.

---

The present invention relates to detergent compositions useful in automatic dish washers and which are based on silicated alkali metal tripolyphosphate produced by reacting aqueous silicate solution with anhydrous tripolyphosphate. In this invention, chlorinated isocyanurates are relied upon to furnish active chlorine in a stable granular composition and the composition does not attack fine china despite an unusually low silica content.

Previously, the production of silicated sodium tripolyphosphate using aqueous alkali metal silicate solution required that the material pass through a condition in which it could be characterized as a moist mass, with the chlorine bleach constituent being present while the moist material aged and before it was ground for use. This made it necessary to employ bleaches such as chlorinated trisodium phosphate. As a result, the prior product would melt and partially decompose when exposed to elevated temperature (about 130° F.) in storage, and in low humidity storage in arid areas, dehydration would take place and the active chlorine would be lost.

It has also been proposed to grind the silicated sodium tripolyphosphate after the moist mass thereof had dried and to add the component containing active chlorine to the ground particles. This enlarges the selection of the component providing active chlorine, but it has previously required a minimum of 30 parts of alkali metal silicate per 65 parts of hydrated alkali metal tripolyphosphate in the final composition. The manufacture of such prior compositions was difficult, and when the silicated tripolyphosphate was made using aqueous sodium silicate, then it was necessary to add more water to the composition than was consistent with product stability.

In this invention, aqueous alkali metal silicate solution of relative high silica content is added slowly in increments to anhydrous granular alkali metal tripolyphosphate and the proportion of the silicate solution is minimized. This avoids the production of a wet mix and the water in the system is drawn from an aqueous silicate coating into an anhydrous tripolyphosphate core by hydration thereof so that the water is tightly bound within the granular product which results. This permits a chlorinated isocyanurate to be selected as the source of active chlorine. The silica content is maintained in the range of 8.5–10%, preferably 9.0–9.8% by weight, based on the weight of the silicated sodium tripolyphosphate. As a result, and despite the ease of production, there is obtained a detergent composition of high bulk density (usually above 0.75 gram per cubic centimeter) which does not melt at 130° F. and which retains its active chlorine content despite prolonged storage at low humidity as well as at high humidity. Moreover, the alkalinity of the mixture is sufficiently low that the low silicate content used is nonetheless sufficient to prevent attack on fine china and aluminum utensils.

The class of alkali metal tripolyphosphates is well known including, for example, sodium tripolyphosphate, potassium tripolyphosphate and the like. The important factors in this invention are that the tripolyphosphate be granular (since grinding is to be largely avoided) and that it be substantially anhydrous (since the silicate solution will introduce just about all the water which can be tolerated.

The use of an aqueous alkali metal silicate is essential to insure the water solubility of the silicated tripolyphosphate. Also, the silicate should contain at least about 2 moles of $SiO_2$ per mol of $M_2O$ where M is the alkali metal (usually sodium or potassium). The silica content of the silicate may be higher, up to a ratio of about 3.4:1, the upper limit being the retention of water solubility. Lastly, the silicate solution must contain sufficient water to be sprayable. As the silica content increases, so does the viscosity at any given solids content. Thus, the silicate solution is used to provide the desired silica content in the final silicated tripolyphosphate. At the higher $SiO_2$-$M_2O$ ratios, the silicate is richer in silica, but it takes more water to provide sprayability. At lower $SiO_2$-$M_2O$ ratios, the silicate is leaner in silica, but it takes less water to provide sprayability. In either event, when the silica content of the silicated tripolyphosphate is limited as taught herein, the amount of silicate solution needed to provide it is minimized and so is the water introduced with such solution. Correspondingly, and since the silicate contains a large excess of silica, the added silicate does not burden the alkalinity of the system.

The aqueous silicate solution is sprayed slowly onto agitated particles of the essentially anhydrous tripolyphosphate so a wet mass is never produced. In this way, grinding is not needed since there is very little agglomeration. This results in a silicated tripolyphosphate of high bulk density in which the water provided by the aqueous silicate solution is absorbed into the tripolyphosphate granule from a silicate coating about the same so as to be effectively unavailable to degrade the stability of the chlorinated isocyanurate compound used to supply active chlorine.

More particularly, the aqueous silicate solution is sprayed slowly onto the tripolyphosphate granules while the same are continuously tumbling in a mixer. As long as one does not spray the silicate solution too rapidly, there is very little agglomeration and the mixture never enters any paste, slurry, or other wet stage. Tumbling is continued after spraying is complete to insure that all the moisture is fully taken up so that when tumbling is discontinued, the powder which is produced is dry, free flowing and of relatively high bulk density, e.g., well in excess of 0.6 gram per cubic centimeter, normally in excess of 0.75 gram per cubic centimeter. Since grinding is not needed, the discrete granules forming the powder are surfaced with silicate from which water has been removed by the powerful dehydrating influence of the anhydrous tripolyphosphate, and extensive grinding, as would expose large surface areas of hydrated tripolyphosphate, is avoided.

The products of this invention when heated sufficiently lose water by dehydration, but they do not melt. The water content of the silicated granules preferably is not in excess of 5% by weight over that amount which can be consumed by the tripolyphosphate in the form of the hexahydrate.

The chlorinated isocyanurate is normally used in an amount of from about 0.5 to about 3% by weight, and may be selected from the group of trichloroisocyanuric acid and alkali metal salts of dichloroisocyanuric acid. The potassium salt is the preferred salt, but sodium is also acceptable. Since these chlorinated isocyanurates include the trichloro derivative of isocyanuric acid, it will be appreciated that the term "isocyanurate" is not limited herein to ordinary salts. Moreover, the isocyanurate compounds may be used alone or in admixture with one another. Thus, a commercially available material is the compound [(mono-trichloro-)tetra-(monopotassium dichloro)]penta-isocyanurate (ACL-66 of Monsanto Company).

While the invention will be illustrated utiizing alkali metal tripolyphosphate, it will be appreciated that portions of the tripolyphosphate may be replaced by sodium carbonate or sodium sulfate and the like; and that dyes, perfumes, and similar compounds such as nonionic surface active agents and the like may be incorporated into the dry mixture if desired. Materials reactive with the chlorinated isocyanurate should be avoided.

Optionally, silicones may be used to further protect the chlorinated isocyanurate as is taught in U.S. Pat. 2,988,510. Methyl silicones are particularly preferred for this purpose. The product silicone L45 having a viscosity of 300–350 centipoises which is available from Union Carbide Corporation illustrates a commercially available material which has been found to be useful.

The invention is illustrated in the following example.

EXAMPLE

Charge a powder mixer with 64.0 parts by weight of anhydrous granular light density sodium tripolyphosphate. While the mixer is running, add slowly (by spraying) 31.3 parts by weight of a liquid sodium silicate solution (40% solids, $SiO_2:Na_2O$ ratio=3.0:1.0). The silicate solution is sprayed in slowly while the powder is continuously tumbling so that a moist mass does not form, and the powder retains its granular form. Tumbling is continued for about 15 minutes after the sodium silicate spray has been completed. In this way, there is provided a free flowing, dry, granulated silicate, tripolyphosphate having a bulk density of about 0.85 grams per cubic centimeter. There are then added, while continuing agitation, 3.0 parts by weight of a chlorine stable, biodegradable nonionic surface active agent which is an ethylene oxidepropylene oxide adduct of a straight chain alcohol such as decyl alcohol. The terminal hydroxy group of the adduct is blocked to improve chlorine bleach stability. Numerous commercial materials of this character are known and available such as Plurfac RA 40 and Plurfac RA 43 of Wyandotte Chemical Company, and Triton CF 54 from Rohm & Haas. Together with the nonionic surface active agent may be added 0.2 part by weight of a perfume which is stable in the presence of the chlorine bleach. Mixing is continued for about 8 minutes to insure uniform admixture of the surface active agent and perfume with the silicated tripolyphosphate. At this point, 1.3 parts by weight of [(monotrichloro-)tetra-(monopotassium dichloro)]penta-isocyanurate are added with continued agitation and agitation is continued for about 8 minutes to provide the final automatic dish wash detergent. If desired, the isocyanurate can be premixed with 0.2 part by weight of a silicone such as silicone L45 of Union Carbide Corporation, referred to previously.

The invention is defined in the claims which follow. We claim:

1. A method for producing a dry granular dish washing detergent comprising, continuously tumbling granules of anhydrous alkali metal tripolyphosphate in a mixer, slowly spraying aqueous alkali metal silicate solution having a silica-alkali metal oxide ratio in excess of 2:1 onto said tumbling granules, the proportion of said silicate solution providing a silica content of from 8.5–10% in the silicated product which is produced, the proportion of silicate solution, the rate of spraying and continued tumbling after spraying is complete directly providing a dry and free flowing granular silicated product, and then incorporating in said granular product from 0.5–3% by weight of chlorinated isocyanurate from the group of trichloroisocyanuric acid, alkali metal salts of dichloroisocyanuric acid and mixtures thereof.

2. A method as recited in claim 1 in which the silica content of said silicated product is in the range of 9.0–9.8%.

3. A method as recited in claim 1 in which the final product possesses a bulk density in excess of 0.75 gram per cubic centimeter.

4. A method as recited in claim 1 in which said tripolyphosphate is sodium tripolyphosphate.

5. A method as recited in claim 1 in which the ratio of silica to alkali metal oxide in said silicate is up to a ratio of about 3.4:1.

6. A method as recited in claim 1 in which said chlorinated isocyanurate is [(mono-trichloro)-tetra-(monopotassium dichloro)]penta-isocyanurate.

7. The product produced by the method of claim 1.

8. The product produced by the method of claim 3.

References Cited

UNITED STATES PATENTS

| | | | |
|---|---|---|---|
| 2,909,490 | 10/1959 | Metziger | 252—135 |
| 2,895,916 | 7/1959 | Milenkevich et al. | 252—99 |
| 3,350,317 | 10/1967 | Symes | 252—99 |
| 3,248,330 | 4/1966 | Feierstein et al. | 252—99 |
| 3,329,616 | 7/1967 | Feierstein et al. | 252—138 |
| 3,247,118 | 4/1966 | Matthaei | 252—99 |
| 2,746,929 | 5/1956 | Wells et al. | 252—135 |

MAYER WEINBLATT, Primary Examiner

U. S. Cl. X.R.

252—135, 138; 23—100, 313